March 3, 1959 H. BIERI ET AL 2,875,718
WORK HOLDING DEVICE
Filed April 24, 1957
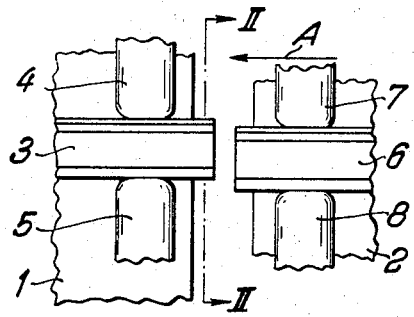
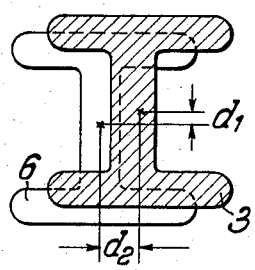
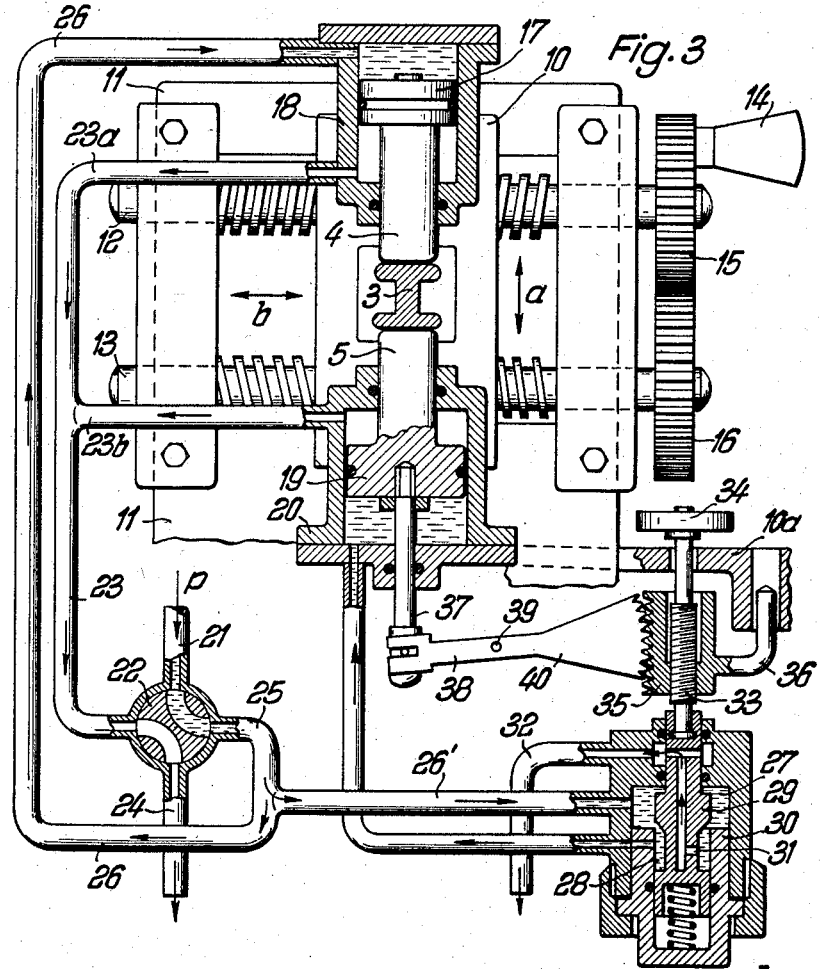
Inventors
Hans Bieri and
Emil Denzler
By Michael S. Striker

United States Patent Office 2,875,718
Patented Mar. 3, 1959

2,875,718

WORK HOLDING DEVICE

Hans Bieri and Emil Denzler, Schlieren, near Zurich, Switzerland, assignors to H. A. Schlatter A. G., Zollikon (Zurich), Switzerland Application April 24, 1957, Serial No. 654,713

Claims priority, application Switzerland May 11, 1956

6 Claims. (Cl. 113—99)

The present invention relates to work holding devices for machines on which the work is to be treated.

Simple mechanical gripping devices are adequate for relatively light work pieces, such mechanical gripping devices being supported on a pair of crossed carriages so that the work may be adjusted with the carriages after the work is gripped. Pneumatic or hydraulic gripping devices are used, however, for heavy work pieces since with such fluid pressure devices it is possible to provide without any difficulty gripping forces of many tons. Crossed carriages for gripping devices of this latter type are extremely expensive, and therefore such carriages are not used. Instead, an adjusting means is used which requires loosening and tightening of the work holding members each time the position of the work is changed. As a consequence, with such devices a considerable amount of time and work is involved in loosening and tightening the work gripping members until the work is finally located in the desired position.

One of the objects of the present invention is to provide a work holding device capable of gripping a work piece and at the same time capable of adjusting the position of the work piece without releasing the gripping thereof.

An additional object of the present invention is to provide a work holding device which may be manually operated in a quick easy manner to adjust the position of a work piece back and forth along a given axis without releasing the work piece.

A further object of the invention is to provide a work holding device capable of accomplishing the above objects and capable of adjusting the position of a work piece in two mutually perpendicular directions.

It is also an object of the present invention to provide structure capable of accomplishing all of the above objects and at the same time composed of simple and ruggedly constructed elements which are very reliable in operation.

With the above objects in view the present invention mainly consists of a work holding device which includes a pair of coaxially spaced gripping members for gripping a work piece between themselves. A support means supports the gripping members for shifting movement along their common axis, and a fluid pressure means cooperates with the gripping members for urging the same toward each other. A manually operable means cooperates with the fluid pressure means and with one of the gripping members for urging the same toward the other gripping member with a force greater or less than that with which the fluid pressure means acts on the other gripping member so that both gripping members will shift in one direction or the other along their common axis until an equilibrium is attained where both gripping members are urged toward each other with equal forces.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a fragmentary, diagrammatic illustration of a pair of sets of gripping members and a pair of work pieces held thereby;

Fig. 2 is a sectional view taken along the line II—II of Fig. 1 in the direction of the arrows and illustrating how one of the work pieces must be moved in order to be properly aligned with the other work piece; and Fig. 3 is a partly diagrammatic, partly sectional view of one possible embodiment of a structure according to the present invention as seen in the direction of arrow A of Fig. 1.

In the description which follows and in the drawing the structure of the invention is shown as used in a welding machine capable of flash butt welding a pair of railroad rails, for example, to each other.

Fig. 1 shows a stationary support 1 and a shiftable support 2, the shiftable support 2 being shiftable to the left and right, as viewed in Fig. 1, toward and away from the stationary support 1, respectively. The end portion of a rail 3 is shown gripped between a pair of gripping members 4 and 5 while the end portion of another rail 6 is shown gripped between another pair of gripping members 7 and 8. As is well known the rails 3 and 6 must be accurately aligned with each other so that they can be properly welded together, and as may be seen from Figs. 1 and 2 the rails 3 and 6 are not in proper alignment with each other. Thus, referring to Fig. 2, it will be seen that the rail 3 must be moved vertically through a distance $d_1$ and horizontally through a distance $d_2$ in order to be properly aligned with the rail 6. When properly aligned the carriage 2 shifts the rail 6 in the direction of arrow A during the welding process.

Fig. 3 illustrates a structure of the invention capable of acting on the gripping members 4 and 5 so as to properly align the rail 3 with respect to the rail 6 without releasing the grip which the members 4 and 5 have on the rail 3.

As may be seen from Fig. 3, a support means in the form of a carriage 10 is provided, this carriage 10 being formed with a cutout through which the rail 3 extends to be gripped by the gripping members 4 and 5. The ends of the carriage 10 are guided for shifting movement to the right and left as shown by the double arrow b by a frame 11 which is stationary and which is fixedly carried by the unillustrated base of the machine. A pair of oppositely threaded spindles 12 and 13 are threadedly connected to the carriage 10 and are supported for rotation about their axes, respectively, by the frame 11, this frame preventing axial shifting of the spindles 12 and 13, so that by turning the spindles 12 and 13 the support means 10 may be shifted in either of the two directions indicated by the arrow b. A pair of gears 15 and 16 mesh with each other and are respectively fixed to the spindles 12 and 13, and a crank in the form of a handle member 14 is fixed to the gear 15 so that the operator may manually turn the latter to produce the desired shifting of the support means 10 in the chosen direction.

A pair of cylinders 18 and 20 are coaxial with each other and are fixedly carried by the support means 10 so as to support the gripping members 4 and 5 on the latter. These gripping members 4 and 5 are coaxial with each other also and are shiftable along their common axis. The gripping member 4 has a piston portion 17 slidable in the cylinder 18, and the gripping member 5 has a piston portion 19 slidable in the cylinder 20. The gripping members respectively have elongated free end portions extending toward each other slidably and fluidtightly through end walls of the cylinders 18 and 20 which are directed toward each other. In the illustrated example the cylinder 20 has a cross sectional area approximately twice as great as that of the cylinder 18. Thus, when fluid at the same pressure acts on the gripping members the gripping member 5 will be urged toward gripping member 4 with a force greater than the fluid pressure applies to the latter.

The fluid medium in the illustrated example may be oil and is pumped with an unillustrated pump from a suitable reservoir to be conveyed at a pressure $p$ along a conduit 21 to a multiple-way valve 22. The conduit 23 communicates with the valve 22 and with a pair of branches 23a and 23b respectively communicating with the cylinders 18 and 20 at the interior portions thereof between the piston poritons 17 and 19 and the front walls of the cylinders which are directed toward each other, respectively. This conduit 23 enables the gripping members to be moved away from each other. Upon turning of the valve 22 in a clockwise direction, as viewed in Fig. 3, through 90° the pressure conduit 21 will be placed in communication with the conduit 23 so that the fluid under pressure will flow into the cylinders to urge the gripping members apart from each other. However, in the illustrated position of the valve 22 the conduit 23 is not under pressure and communicates with a conduit 24 leading back to the unillustrated reservoir for the fluid medium.

A conduit means 25 communicates with the valve 22 and with the cylinders 18 and 20 for supplying to the latter the fluid under pressure which urges the gripping members 4 and 5 toward each other into a gripping position. Thus, in the illustrated position of the valve 22 the fluid under pressure flows to the conduit 25, and a branch 26 thereof leads to the cylinder 18 so that the fluid under pressure acts on the piston portion 17 to urge the gripping member 4 downwardly, as viewed in Fig. 3.

The branch 26′ of the conduit 25 is not connected directly to the cylinder 20. Instead, a manually operable means cooperates with the fluid pressure means through the conduit branch 26′ as well as with the gripping member 5 for varying the fluid pressure to provide on the piston portion 19 a force greater or less than that acting on the piston portion 17 so as to cause the gripping members 4 and 5 to shift together in one direction or the other along their common axis until equilibrium is reached.

The portion of the branch 26′ extending from the valve 22 communicates with an inlet chamber 27 of a valve housing carried by carriage 10, the interior of this valve housing being provided with a discharge chamber 28 which communicates through another portion of the branch 26′ with the interior of the cylinder 20. An annular valve seat member 30 separates the chambers 27 and 28 from each other, and an elongated valve member 29 is axially shiftable in the valve housing toward and away from a closed position engaging the valve seat member 30 to close off the chambers 27 and 28 from each other. The shiftable valve member 29 is formed with a leakage path 31 of small cross section communicating with the discharge chamber 28 and communicating at its upper end, as viewed in the drawing, with an annular passage formed in the valve housing and communicating with a low pressure conduit 32 leading to the reservoir of the fluid medium. Thus, the oil in the discharge chamber 28 is capable of slowly passing from the chamber 28 to the conduit 32. The further the valve member 29 is from the valve seat 30 the greater the pressure in the chamber 28 and as a consequence the greater the pressure of the fluid medium in the cylinder 20.

A threaded spindle 33 is turnably connected to the valve member 29 but is incapable of shifting axially with respect to the latter so that spindle 33 and valve member 29 must shift together axially while the spindle 33 can turn about its axis with respect to the valve member 29. A hand wheel 34 is fixed to the end of the spindle 33 distant from the valve member 29.

The spindle 33 threadedly engages a portion of a rack member 35 which has an extension 36 extending freely into a bore of the part 10a of the carriage 10, so that the rack member 35 cannot turn about the axis of the spindle 33 but can move along this axis.

A rod 37 is fixed to the piston portion 19 and extends slidably and fluid-tightly through and beyond the wall of cylinder 20 opposite from that through which the gripping member 5 extends. This rod 37 is connected by a pin and slot connection to one end of a lever 38 which is pivotally supported intermediate its ends by pivot pin 39 fixed to carriage 10. At its end distant from the rod 37 and on the opposite side of pin 39 from the rod 37 the lever 38 is provided with a toothed sector 40 meshing with the rack 35.

It is apparent that the pressure in the discharge chamber 28 depends upon the pressure drop provided by the leakage path 31 and the pressure of the chamber 28 approaches more closely to the pressure $p$ as the valve member 29 is more distant from the valve seat 30. Inasmuch as the position of the valve member 29 will be determined by the position of the gripping member 5 acting on the valve member 29 through the linkage 37, 38, rack 35 and spindle 33, it is apparent that the gripping member 5 will automatically assume a position where the fluid flowing from the chamber 28 to the cylinder 20 will provide on the gripping member 5 the same force that the fluid in the cylinder 18 provides on the gripping member 4. This equilibrium condition is provided only when a predetermined gap exists between valve member 29 and seat 30, which is to say when the gripping member 5 is in a predetermined position.

If the operator turns the hand wheel 34 in a direction which causes the valve member 29 to move downwardly, as viewed in Fig. 3, then the valve member 29 approaches the valve seat 30 so as to reduce the gap between these elements and the pressure in the discharge chamber 28 drops. As a result the pressure acting on the gripping member 5 falls below the pressure acting on the gripping member 4 and the latter is capable of moving the gripping member 5 downwardly until the equilibrium is again attained, so that in this way the work 3 will automatically be moved downwardly, as viewed in Fig. 3, without the gripping members 4 and 5 releasing their grip. It will be noted that the downward movement of the gripping member 5 causes the valve member 29 to be raised so as to increase the pressure in the chamber 28 until equilibrium is reached.

On the other hand, if the hand wheel 34 is turned so as to shift the valve member 29 away from the valve seat 30, the pressure in the chamber 28 will increase so that the pressure of the fluid medium in the cylinder 20 also increases, and at this time the force acting on the gripping member 5 will be greater than that acting on the gripping member 4, so that the two gripping members together with the work 3 will shift upwardly until equilibrium is again attained. At this time, the valve member 29 will be shifted back toward the valve seat 30 so as to automatically reduce the pressure in the chamber 28.

Thus, all that the operator need do with the structure of the invention is to operate the hand wheel 34 in one direction or the other so as to adjust the position of the work piece in the direction of the double arrow $a$, and the grip on the work is never released. The handle 14 is turned in order to adjust the work in the perpendicular direction $b$, and all conduits are flexible to permit movement of the parts.

Instead of threaded spindles 12 and 13, the transverse adjustment of the carriage 10 may also be carried out pneumatically or hydraulically with a structure equivalent to that described above for adjusting the work in the direction of arrow *a*.

Of course, instead of making the cylinder 20 of a greater cross section than the cylinder 18, it is possible to provide in a smaller cylinder housing the gripping member 5 a fluid at a pressure greater than that in the fluid of the cylinder 18, but the above-described structure is preferred since it is possible with this structure to lead a fluid medium from a single source to both cylinders. Thus, simply by making the cylinder 20 of a greater diameter than the cylinder 18 it is possible to provide a greater force acting on the gripping member 5 with the same fluid medium.

It will be understood that each of the elements described above, or two or more together, may also find a useful application in other types of work holding devices differing from the types described above.

While the invention has been illustrated and described as embodied in an adjustable work holding device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a work holding device, in combination, a pair of coaxial gripping members for gripping a work piece between themselves; support means supporting said gripping members for movement along their common axis; fluid pressure means cooperating with said gripping members for urging the same along their common axis toward each other to grip a work piece; manually operable valve means cooperating with said fluid pressure means and with one of said gripping members for urging said one gripping member toward the other gripping member, when said valve means is manually operated in an opening direction or in an opposite closing direction, with a force greater than or less than the force with which said fluid pressure means urges said other gripping member toward said one gripping member so that the pair of gripping members will shift along their common axis in one direction or the other; and means connecting said one gripping member with said valve means for automatically moving the latter in a direction opposite to that in which it is manually moved until equilibrium is reached, whereby said manually operable means is capable of being actuated to adjust the position of a work piece gripped by said gripping members along said axis.

2. In a work holding device, in combination, a pair of coaxial gripping members for gripping a work piece between themselves; support means supporting said gripping members for movement along their common axis; fluid pressure means cooperating wtih said gripping members for urging the same along their common axis toward each other to grip a work piece; manually operable valve means cooperating with said fluid pressure means and with one of said gripping members for urging said one gripping member toward the other gripping member, when said valve means is manually operated in an opening direction or in an opposite closing direction, with a force greater than or less than the force with which said fluid pressure means urges of said other gripping member toward said one gripping member so that the pair of gripping members will shift along their common axis in one direction or the other; means connecting said one gripping member with said valve means for automatically moving the latter in a direction opposite to that in which it is manually moved until equilibrium is reached, whereby said manually operable means is capable of being actuated to adjust the position of a work piece gripped by said gripping members along said axis; and manually operable means operatively connected to said support means for shifting the latter together with said gripping members and a work piece gripped therebetween in a direction perpendicular to said common axis, so that the work piece may also be adjusted in a direction transverse to said common axis.

3. In a work holding device, in combination, support means; a pair of coaxial cylinders spaced from each other and carried by said support means; a pair of coaxial gripping members respectively having piston portions respectively slidable in said cylinders and respectively having elongated gripping end portions extending slidably and fluid-tightly toward each other through end walls of said cylinders which are respectively directed toward each other; a pair of conduit means communicating with said cylinders for supplying to the latter a fluid medium under pressure for urging said gripping members toward each other to grip a work piece between said elongated gripping end portions thereof; valve means having an equilibrium positioning between its fully open and fully closed positions and cooperating with one of said conduit means for controlling the flow of fluid therethrough to the interior of one of said cylinders, said valve means having a valve member movable in opposite directions for changing the pressure of the fluid medium in said one cylinder to urge the gripping member in said one cylinder toward the other gripping member with a force greater or less than that with which the fluid medium in the other cylinder urges said other gripping member toward the gripping member extending from said one cylinder, so that the gripping members will shift along their common axis in one direction or the other; manually operable means operatively connected with said valve member for moving the same manually in one or the other of said directions so as to shift said gripping members along their common axis; and motion transmitting means operatively connected with the gripping member in said one cylinder and with said valve member for automatically shifting said valve member, in response to movement of the latter gripping member, in a dircetion opposite to that in which the valve member was manually moved until said equilibrium position of said valve means is reached.

4. In a work holding device, in combination, support means; a pair of coaxial cylinders carried by said support means and spaced from each other, one of said cylinders having a larger diameter than the other; a pair of gripping members respectively having piston portions respectively in said cylinders and respectively having elongated free end portions extending slidably and fluidtightly toward each other through end walls of said cylinders which are directed toward each other so that a work piece may be gripped between said free end portions of said gripping members, respectively; conduit means communicating with the interiors of both cylinders for directing a fluid at substantially the same pressure to both cylinders for urging said gripping members toward each other; valve means communicating with a portion of said conduit means leading to the interior of said one cylinder and having an inlet chamber receiving fluid from a part of said conduit means upstream of said valve means and a discharge chamber from which the fluid flows to said one cylinder, said valve means including a valve member shiftable in opposite directions for controlling the area of communication between said chambers for varying the pressure of the fluid in said one cylinder to urge the gripping member in said one cylinder toward the other gripping member with a greater or lesser force than that with which the other gripping member is urged toward said one cylinder, so that said gripping members will shift along their common axis in one direction or the other; second conduit means communicating with and leading from said discharge chamber of said valve means for continuously discharging fluid under pressure from said discharge chamber at a predetermined rate providing said valve member with an equilibrium position where the pressures in said chambers are equal; manually operable means cooperating with said valve member for moving the same in one direction from its equilibrium position to said gripping members along their common axis; and transmission means cooperating with the gripping member in said one cylinder and with said valve member for automatically moving the latter in a direction opposite to that in which it is manually moved, in response to movement of the latter gripping member, until said valve member reaches said equilibrium position, so as to adjust the position of a work piece along said axis.

5. In a work holding device, in combination support means; a pair of coaxial clyinders spaced from each other and carried by said support means, one of said cylinders having a larger diameter than the other; a pair of coaxial gripping members respectively having piston portions respectively slidable in said cylinders and respectively having elongated free end portions extending toward each other slidably and fluid-tightly through end walls of said cylinders which are directed toward each other so that a work piece may be gripped between said free end portions of said gripping members; conduit means respectively having a pair of branches respectively communicating with said cylinders for supplying to the latter a fluid medium for urging said gripping members toward each other; valve means located in that one of said branches of said conduit means which leads to said one cylinder so that the fluid medium flowing along said one branch to said one cylinder must flow through said valve means, said valve means having an inlet chamber to which the fluid medium is supplied and a discharge chamber from which the fluid medium flows to said one cylinder and said valve means having a shiftable valve member located in both chambers and shiftable toward and away from a position closing off said chambers from each other, said shiftable valve member being formed with a leakage path communicating with said discharge chamber and through which the fluid medium may discharge slowly out of said discharge chamber, whereby the pressure of the fluid medium in said one cylinder will depend upon the distance of said valve member from said position closing off said chambers from each other; linkage means interconnecting the gripping member in said one cylinder with said valve member for automatically shifting the latter to a position where the fluid medium in said one cylinder urges the gripping member therein toward the other gripping member with a force equal to that with which said other gripping member is urged toward said one cylinder so that said linkage means automatically shifts said gripping member in said one cylinder and said valve member to an equilibrium position; and manually operable means operatively connected to said valve member for manually shifting the latter to place said gripping members out of equilibrium and to increase or decrease the pressure of the fluid medium in and one cylinder so that said gripping members will automatically shift in one direction or the other until equilibrium is again attained.

6. In a work holding device, in combination, a stationary cylinder; a gripping member having a piston portion slidable in said cylinder and having an elongated free end extending slidably and fluid-tightly through one end wall of said cylinder; a rod fixed to said gripping member and extending slidably and fluid-tightly through an opposite end wall of said cylinder; a lever pivotally supported intermediate its ends, connected at one end to said rod at the exterior of said cylinder, and having a toothed sector at its opposite end; a rack member meshing with said toothed end of said lever; a threaded spindle threadedly engaging said rack member and being parallel to the row of rack teeth thereof, said spindle being manually turnable; means cooperating with said rack member for preventing rotation thereof so that said rack member is compelled to move in a direction parallel to the axis of said spindle; a valve housing having in its interior a valve seat member dividing the interior of said housing into an inlet chamber on one side of said valve seat member and a discharge chamber on the other side of said valve seat member, said valve housing also having a low pressure outlet passage; a valve member shiftable in said valve housing to and from a position engaging said seat to close said chambers from each other, said valve member being formed with a leakage path communicating with said discharge chamber and with said outlet passage for leading a fluid medium from said discharge chamber to said outlet passage at a slow rate, said valve member being operatively connected to said spindle for shifting axially with the latter; a first conduit communicating with said inlet chamber of said valve housing for supplying a fluid medium thereto; and a second conduit communicating with said discharge chamber of said valve housing and with said cylinder for leading the fluid medium from said discharge chamber to said cylinder for acting on said gripping member.

References Cited in the file of this patent

UNITED STATES PATENTS

| | | |
|---|---|---|
| 1,234,882 | Doble | July 31, 1917 |
| 2,582,011 | Cunningham | Jan. 8, 1952 |
| 2,787,698 | Schlatter et al. | Apr. 2, 1957 |
| 2,795,346 | Farmer | June 11, 1957 |